United States Patent
Yang et al.

(10) Patent No.: US 7,173,982 B1
(45) Date of Patent: Feb. 6, 2007

(54) METHOD AND CIRCUIT FOR DIGITALLY CORRECTING THE FREQUENCY OF A SIGNAL

(75) Inventors: Bin Yang, München (DE); Steffen Buch, München (DE)

(73) Assignee: Infineon Technologies AG, Munich (DE)

( * ) Notice: Subject to any disclaimer, the term of this patent is extended or adjusted under 35 U.S.C. 154(b) by 806 days.

(21) Appl. No.: 10/089,805

(22) PCT Filed: Oct. 11, 2000

(86) PCT No.: PCT/DE00/03601

§ 371 (c)(1),
(2), (4) Date: Jul. 29, 2002

(87) PCT Pub. No.: WO01/28176

PCT Pub. Date: Apr. 19, 2001

(30) Foreign Application Priority Data

Oct. 11, 1999 (DE) .................. 199 48 899

(51) Int. Cl.
*H04L 27/22* (2006.01)

(52) U.S. Cl. .......... 375/329; 375/322; 375/324; 329/315

(58) Field of Classification Search .......... 375/147, 375/271, 272, 279, 316, 320, 329, 362, 130, 375/140, 259, 322, 324, 326, 354; 329/304, 329/315, 341, 343
See application file for complete search history.

(56) References Cited

U.S. PATENT DOCUMENTS

| 4,603,300 A | * | 7/1986 | Welles et al. ............ 329/323 |
| 4,884,265 A | * | 11/1989 | Schroeder et al. .......... 370/484 |
| 5,052,050 A | * | 9/1991 | Collier et al. ............... 455/296 |
| 5,550,869 A | | 8/1996 | Gurantz et al. |
| 5,748,682 A | | 5/1998 | Mobin |
| 5,784,414 A | * | 7/1998 | Bruekers et al. ............ 375/324 |
| 6,192,089 B1 | * | 2/2001 | Corleto et al. .............. 375/344 |
| 6,693,970 B2 | * | 2/2004 | Vankka ....................... 375/261 |
| 2003/0206600 A1 | * | 11/2003 | Vankka ....................... 375/261 |

FOREIGN PATENT DOCUMENTS

| EP | 0 481 543 A1 | 4/1992 |
| EP | 0 486 095 A1 | 5/1992 |
| EP | 0 545 546 A2 | 6/1993 |

OTHER PUBLICATIONS

Jack E. Volder, 'The CORDIC Trigonometric Computing Technique', Sep. 1959, IRE Transcations on Electronic Computers, vol. EC-8, pp. 330-334.*
S. Nahm et al., "A Cordic-Based Digital Quadrature Mixer: Comparison with a ROM-Based Architecture", ISCAS '98. Proceedings of the 1998 IEEE International Symposium on Circuits and Systems, Bd. 4, May 31, 1998, Seiten 385-388, XP000873520, New York, USA ISBN: 0-7803-4456-1, Seite 386 Linke Spalte.

* cited by examiner

*Primary Examiner*—Pankaj Kumar
*Assistant Examiner*—Naheed Ejaz
(74) *Attorney, Agent, or Firm*—Staas & Halsey LLP

(57) ABSTRACT

A method and a circuit for the digital correction of a frequency of a signal, especially for use in a transmitter/receiver circuit include rotating a signal "pointer" (i0, q0) using a CORDIC algorithm, through a predetermined angle in a complex I/Q plane corresponding to a correction frequency. The CORDIC algorithm includes micro-rotation blocks corresponding to N stages, and a character table and a register.

28 Claims, 2 Drawing Sheets

METHOD AND CIRCUIT FOR DIGITALLY CORRECTING THE FREQUENCY OF A SIGNAL

CROSS-REFERENCE TO RELATED APPLICATIONS

This application claims the benefit of and priority to International Application PCT/DE00/03601, filed October 11, and German Patent Application GR 99 P 5026, filed Oct. 11, 1999, the contents of each of which are incorporated herein.

BACKGROUND OF THE INVENTION

1. Field of the Invention

The invention relates to a process and a circuit arrangement for digital frequency correction of a signal, in particular for use in a transceiver circuit, by sampling the signal with a predetermined cycle and processed using an N-step CORDIC algorithm so that a frequency of the signal is altered by a predetermined frequency.

2. Description of the Related Art

In transceiver circuits, local oscillators are used to produce a reference frequency. Particularly because of production tolerances, temperature fluctuations, and supply voltage fluctuations, undesired fluctuations of the reference frequency can occur. The undersigned fluctuations of the reference frequency causes a signal to be processed having large frequency fluctuations, and a power of the transceiver circuit is thereby reduced.

In order to counteract the undesired fluctuations, expensive and high quality oscillators are, for example, used in the transceiver circuits, to produce a very stable reference frequency, i.e., an oscillator which is precise and free from fluctuation. Likewise, oscillators compensated for voltage fluctuations and for temperature variations can also be used to reduce a dependence on the reference frequency for the voltage fluctuations and the temperature variations. Furthermore, so-called automatic frequency correction control loops (AFC loops) are frequently used to precisely set the local reference frequency. However, the AFC loops are disadvantageous in that the AFC loops are expensive and very costly in circuit technology.

In order to keep the costs of the transceiver low, in particular for use in mass produced articles, such as mobile telephones, cheap oscillators have been used which have neither a voltage supply control device nor a temperature control device. However, particularly in such products, no excessive fluctuation of the reference frequency can be tolerated. A subsequent correction of the frequency of the signal to be processed is therefore unconditionally necessary.

A frequency correction process of a baseband signal x in a transceiver circuit, for example of a mobile radio receiver, can be represented mathematically as follows: sampling values $x(k)$ of the baseband signal $x(k)=i(k)+j\cdot q(k)$ (with $j=\sqrt{-1}$), symbols which have a symbol duration T, are multiplied by sampling values of a (complex) frequency correction signal $z(k)=2\pi t\cdot T/m\cdot k$, m being an oversampling factor. The multiplication in a time domain corresponds in a frequency domain to a frequency displacement of the baseband signal $x(k)$ by a frequency f. In a complex signal pointer plane, the multiplication represents a rotation of the "pointer" $x(k)$ through an angle $z(k)$:

$$x(k)\exp(jz(k)) = [i(k) + jq(k)][\cos(z(k)) + j\sin(z(k))]$$
$$= [i(k)\cos(z(k)) - q(k)\sin(z(k))] +$$
$$j[i(k)\sin(z(k)) + q(k)\cos(z(k))]$$

The more precise and more finely adjustable a frequency correction signal $z(k)$, the better the frequency correction; i.e., the "pointer" $x(k)$ can be rotated in finer steps in the complex plane.

The frequency correction according to the above equation may be calculated using digital multipliers and coefficient tables for a sine and cosine functions; which demands, though, a very high circuit technology cost which makes such a solution expensive and costly. In particular, when embodied as an integrated circuit, this solution requires a large chip surface and is, therefore, very expensive.

SUMMARY OF THE INVENTION

The invention therefore has as its object to provide a process and a circuit arrangement for digital frequency correction, particularly for use in a transceiver circuit, which produces a very precise frequency correction with a small circuit technology cost.

The above and other objects are attained using a process.

An exemplary embodiment of the present invention includes an CORDIC (Coordinate Rotation Digital Computer) algorithm for digital frequency correction of a signal. Namely, a frequency and phase correction can be carried out relatively simply using the CORDIC algorithm. The CORDIC algorithm can be carried out with a small circuit technical cost, so that costs of a circuit based on the CORDIC algorithm and an inexpensive oscillator are smaller than the costs of a compensated oscillator.

The CORDIC algorithm is described in J. E. Voider, "The CORDIC trigonometric computing technique", IRE Trans. Electronic Computers, Vol. 8, pp. 340–344, 1959, This algorithm is n-fold iterative and serves to rotate a vector through a defined angle $\alpha_n=\arctan(2^{-n})$, $n=0, 1, \ldots, N-1$. If the vector represents a pointer of a complex signal, a change in a frequency of the signal corresponding to a multiplication by a frequency correction signal is possible by means of this rotation. The rotation angle becomes smaller with each iteration ($\alpha_0=45°>\alpha_1=26.6°> \ldots >\alpha_{N-1}$, so that the frequency of the signal changes in smaller steps with increasing iteration steps.

The iterative rotation through an angle a can be represented by the following linear combination:

$$a=\sigma_0\alpha_0+\sigma_1\alpha_1+ \ldots +\sigma_{N-1}\alpha_{N-1} \; (\sigma_n=\pm 1)$$

A precision of the rotation is predetermined by the smallest rotation angle $\alpha_{N-1}$. A direction of rotation (+1 counter-clockwise, −1 clockwise) is given by the sign $\sigma_n$.

A signal which is represented by sampling values of the in-phase component $I_n$ and the quadrature component $Q_n$ is iteratively rotated through the angle a by the CORDIC algorithm. For this purpose, the individual rotations according to the CORDIC algorithm can be executed by simple shift and addition operations:

$$I_{n+1}=I_n-\sigma_n 2^{-n}Q_n$$

$$Q_{n+1}=\sigma_n 2^{-n}I_n+Q_n$$

The above equation can also be represented as follows, using the equation an $\alpha_n = \arctan(2^{-n})$ for the rotation angle:

$$I_{n+1} = \text{sqrt}(1+2^{-2n})\,[\cos(\sigma_n \alpha_n)\,I_n - \sin(\sigma_n \alpha_n)\,Q_n]$$

$$Q_{n+1} = \text{sqrt}(1+2^{-2n})\,[\sin(\sigma_n \alpha_n)\,I_n + \cos(\sigma_n \alpha_n)\,Q_n]$$

After N rotations, the following is obtained:

$$I_N = K \cdot [\cos(z)\,I_0 - \sin(z)\,Q_0]$$

$$Q_N = K \cdot [\sin(z)\,I_0 + \cos(z)\,Q_0]$$

with K=1.647. The signal to be corrected can be adjusted in frequency using the process described above.

In the process according to the invention, the complex multiplication of the sample values x(k) of the signal, particularly of a baseband signal, by the frequency correction signal z(k) is now executed using the CORDIC algorithm. Because a principle no "rigid" frequency correction occurs, and a frequency correction which is variable because of the CORDIC algorithm, the constancy of a reference signal of the oscillator does not play a significant part.

In order to use the CORDIC algorithm for the process according to the present invention, a few disadvantages of the CORDIC algorithm must however be compensated for by the invention. In particular, because the CORDIC algorithm allows only a limited correction range of a rotation angle of approximately 99°, a reduction of the rotation angle required for correction is required. It is provided, according to the invention, for this purpose to correct the rotation angle so that the rotation angle always has a value less than or equal to 90°. The rotation angle represented by z(k) is a stored modulo $2\pi$, in a register of a bit width $N_w$. The value w(k) stored in the register is accumulated according to an equation $w(k) = w(k-1) + f \cdot T/m$. A value 111 . . . 111 for w(k) corresponds to a greatest value $1 - 2^{N_w}$, corresponding to an angle of $2\pi \cdot (1 - 2^{N_w})$. The modulo $2\pi$ operation is, thus, attained by simply neglecting an overflow of the register.

Furthermore, in order to provide optimum execution of the CORDIC algorithm, the pointer z(k) needs to be represented by a frequency correction signal lying in a first or a fourth quadrant of a complex I/Q plane. For this purpose, an in-phase and quadrature components of the pointer of the signal to be corrected are respectively multiplied by $(-1)^s$, s=0.1, in order to turn the pointer through the angle $z(k) - \pi$ when the pointer lies in a second or a third quadrant of the complex I/Q plane.

A sign flag s is calculated like the sign $\sigma_n$ for the individual iterations (micro-rotations) of the CORDIC algorithm. According to the invention, a sign table is provided for this purpose, in which the corresponding sign of the micro-rotation is set out for all possible micro-rotations, such that the sign flag s and the two signs $\sigma_0$ and $\sigma_1$ are calculated directly and the remaining signs $\sigma_n$, n=2, 3, . . . , N−1 are calculated from the bits $w_1, w_2, w_3, \ldots, w_{N+1}$ of a value w(k) stored in the register.

The bit width $N_w$ of the register and the number of micro-rotations N of the CORDIC algorithm affect the correction range or a phase noise of the frequency-corrected signal $x(k)\exp(jz(k))$ and are therefore to be chosen according to the present invention as follows. A bit width $N_w$ is to fulfill the following inequality for a correctable frequency range $\Delta f$:

$$N_w \geq \log 2(m) - \log 2(\Delta f \cdot T)$$

For a desired signal to phase noise ratio SNR, a number N of the micro-rotations is chosen as follows:

$$(SNR+3)/6 \leq N \leq N_w - 2$$

The desired signal to phase noise ratio SNR is thus attained, an upper limit for N being predetermined by the bit width of the register.

Finally, another two guard bits have to be provided in each iteration of the algorithm during the implementation of the CORDIC algorithm, in order to be able to process the greatest possible value of the scaling factor, namely sqrt(2) K=sqrt(2) 1.647 2.33. K is a scaling factor because of the CORDIC algorithm and sqrt(2) is a possible "growth factor" of the in-phase and quadrature components due to the CORDIC algorithm. Accordingly, an input bit width and an output bit width of the CORDIC algorithm should be as great as possible, for instance, at least greater than N+2. A greater phase noise would otherwise be produced by rounding errors of the CORDIC algorithm than by phase errors.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The following description of preferred embodiments of the invention, using the accompanying drawings, serves for further explanation of the invention.

DETAILED DESCRIPTION OF THE PREFERRED EMBODIMENTS

Figure 1:
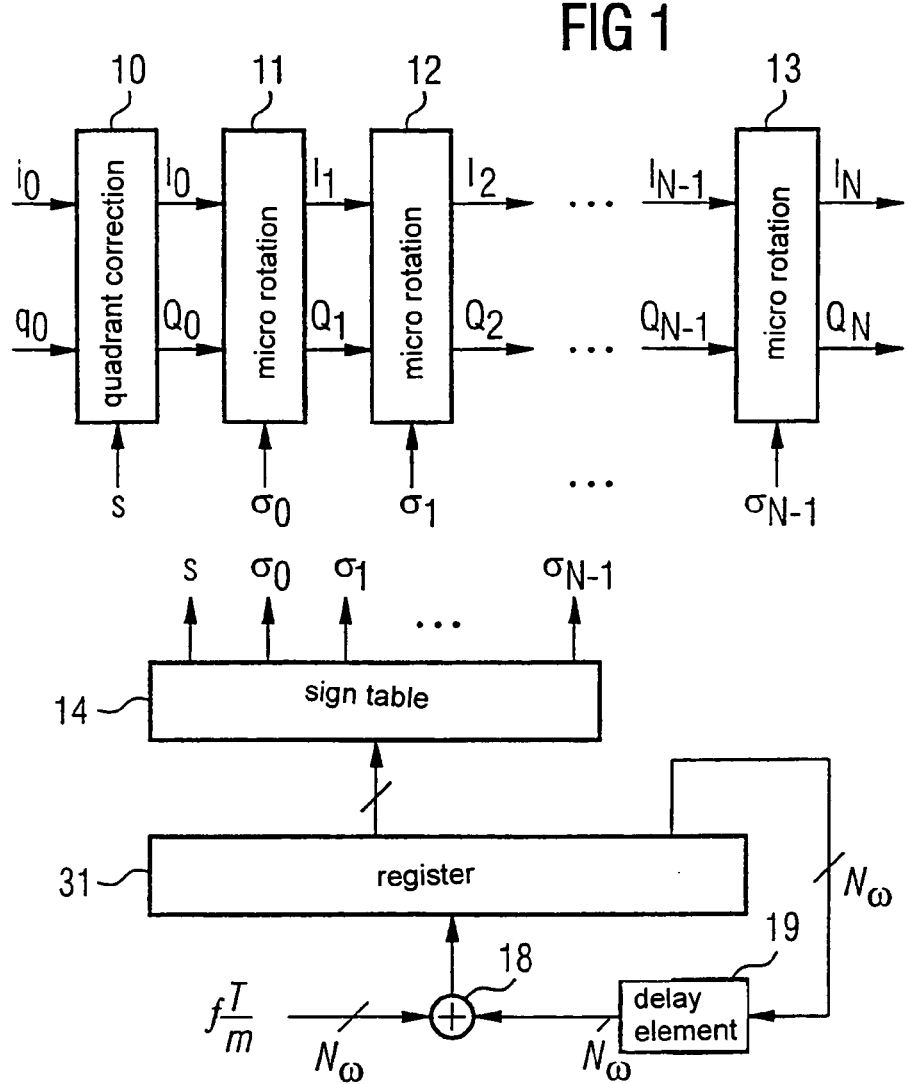
FIG. 1 shows a block circuit diagram with essential components for carrying out a process according to the invention.

In FIG. 1, sampling values $i_0$ and $q_0$ of an in-phase or quadrature components of a complex baseband signal x(k) are supplied to a quadrant correction block 10, where k denotes discrete sampling times. The quadrant correction block 10 causes a pointer represented by the baseband signal x(k) to lie in a first or fourth quadrant of a complex in-phase/quadrature I/Q plane. Namely, if the pointer lies in a second or third quadrant, CORDIC algorithm does not work correctly. As already described, the in-phase and quadrature components have to be respectively multiplied by −1 if the pointer is situated in the second or third quadrant of the complex I/Q plane.

N micro-rotation blocks in sequence follow the quadrant correction block 10 although three of these blocks, 11, 12, 13, are shown, a one of ordinary will appreciate that more blocks may be implemented. Each micro-rotation block calculates a step of the CORDIC algorithm, i.e., rotates the pointer represented by the in-phase and quadrature components in the complex I/Q plane through an angle $\pm \alpha_n = \pm \arctan(2^{-n})$. Components $I_0$ and $Q_0$ are present at an input of a micro-rotation block 11, and represent at an output, as the components $I_1$ and $Q_1$, a pointer rotated through the angle $\pm \alpha_2 = \pm \arctan(1)$. The components $I_2$ and $Q_2$ are present at an output of a micro-rotation block 12, and represent a pointer rotated through an angle $\pm \alpha_1 = \pm \arctan((2^{-1}))$. Finally, a pointer represented by in-phase component $I_n$ and an original quadrature $Q_n$ and representing the frequency-corrected complex baseband signal is present at an output of a micro-rotation block 13 after passage through N steps of the CORDIC algorithm. The rotation is either counterclockwise or clockwise in each rotation in a micro-rotation block. The direction of rotation depends on a sign $\sigma_n$.

The sign $\sigma_n$ and an input signal s for the quadrant correction block 10 are produced by a sign table 14. The sign table 14 is driven by a register 31 with a bit width $N_w$ in which a register value w with $N_w$ bits is deposited. The first (N+2) bits of w(k) of a register 31 are supplied to the sign table 14.

Figure 2:
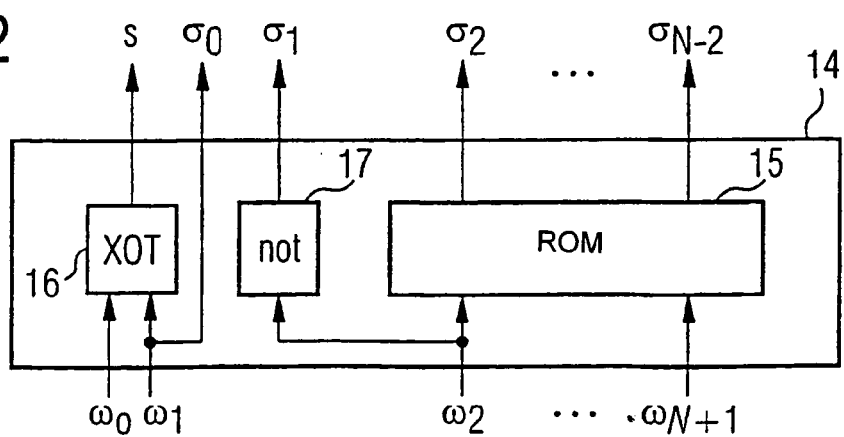
FIG. 2 shows a structure of a sign table for a CORDIC algorithm.

The structure of the sign table 14 is shown in FIG. 2. The input signal s for the quadrant block 10 is calculated by a logical XOR operation 16 on two lowest bits $w_0$ and $w_1$ of the register value w. A first sign $\sigma_0$ corresponds directly to the bit $w_1$ of the register value w. A second sign $\sigma_1$ is calculated by inverting 17 a bit $w_2$ of the register value w. Remaining signs $\sigma_2$ through $\sigma_{N-1}$ are deposited in a read-only memory 15 (ROM), in which $2^N$ (N–2) bits are stored. The ROM or read-only memory 15 can be made smaller by a calculation of s, $\sigma_0$ and $\sigma_1$ from the three lowest bits $w_0$–$w_2$; namely, a memory capacity of $2^{N+2}$ (N+1) bits would otherwise be required.

The following table clarifies the calculation of s, $\sigma_0$ and $\sigma_1$ from the three lowest bits $w_0$ through $w_2$ of the register value w, and a corresponding rotation angle range:

| $w_0$ | $w_1$ | $w_2$ | Rotation angle range | | Quadrant | s | $\sigma_0$ | $\sigma_1$ |
|---|---|---|---|---|---|---|---|---|
| 0 | 0 | 0 | 0° | 45° | I | 0 | 0 | 1 |
| 0 | 0 | 1 | 45° | 90° | I | 0 | 0 | 0 |
| 0 | 1 | 0 | 90° | 135° | II | 1 | 1 | 1 |
| 0 | 1 | 1 | 135° | 180° | II | 1 | 1 | 0 |
| 1 | 0 | 0 | 180° | 225° | III | 1 | 0 | 1 |
| 1 | 0 | 1 | 225° | 270° | III | 1 | 0 | 0 |
| 1 | 1 | 0 | 270° | 315° | IV | 0 | 1 | 1 |
| 1 | 1 | 1 | 315° | 360° | IV | 0 | 1 | 0 |

The signs $\sigma_n$ are coded such that a logical "0" means a counter-clockwise rotation and a logical "1" means a clockwise rotation. Input bits of the sign table 14, i.e., of the register value w, are calculated cumulatively, w(k)=w(k–1)+f·T/m, starting from the default value f·T/m. An adder 18 and a delay element 19 are provided for this purpose. The delay element 19 delays the last register value w(k–1) by the time T/m. The adder 18 then adds the default value f·T/m, which predetermines a correction frequency f, to w(k–1). A result of the addition then gives a new register value for the register 31.

Figure 3:
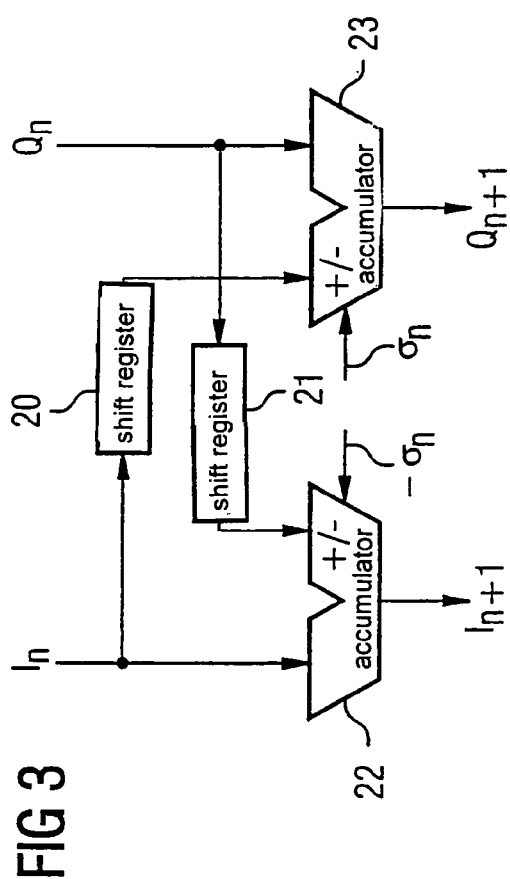
FIG. 3 shows a structure of a micro-rotation block for a CORDIC algorithm.

The structure of a micro-rotation block, which calculates the basic CORDIC operation previously described, $$I_{n+1} = I_n \cdot \sigma_n 2^{-n} Q_n$$

$$Q_{n+1} = \sigma_n 2^{-n} I_n + Q_n$$

is shown in FIG. 3. For this purpose, a first and a second shift register, 20 or 21 respectively, are provided, respectively shifting the in-phase component $I_n$ or the original quadrature component $Q_n$ by n bits ($2^{-n}$). The in-phase component or the original quadrature component shifted by n bits is then multiplied by the sign $\sigma_n$ or $-\sigma_n$, i.e., the sign of the displaced component is correspondingly altered, and is added to the original quadrature component $Q_n$ or in-phase component $I_n$ in a first 22 or second 23 accumulator, respectively. The result is a rotated pointer, represented by the in-phase component $I_{n+1}$ and the quadrature component $Q_{n+1}$.

Figure 4:
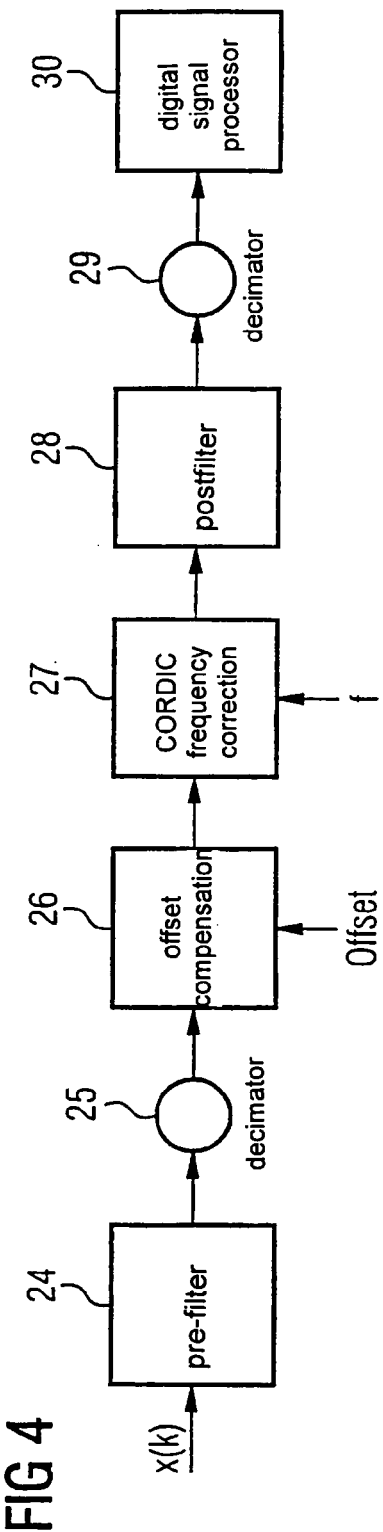
FIG. 4 shows a use of the process, according to the invention, in a transceiver of a GSM mobile telephone.

FIG. 4 shows an exemplary use of the process according to the present invention in a transceiver of a GSM mobile telephone. Sampling values x(k) of a baseband signal are supplied to a digital prefilter 24 which is operated with a high cycle rate, which is a multiple of a sampling rate of 2 of the baseband signal.

Following the digital prefilter 24 is a first decimator 25, which divides the high cycle rate of the output signal of the prefilter 24 into a lower cycle rate. The first decimator 25 is provided with an offset compensation block 26 for the compensation of a DC offset, i.e., a DC portion, possibly contained in the baseband signal. The DC offset to be compensated is predetermined for the offset compensation block 26 by a digital signal processor 30. The digital signal processor 30, based on first sampling values of the baseband signal, estimates an offset or DC portion possibly contained in the baseband signal, and supplies the estimated offset or DC portion to the offset compensation block 26 for compensation. If the offset or the DC portion of the baseband signal is removed, the offset would be transformed by the CORDIC algorithm into an interfering sine signal, which for example, is only to be expensively removed again in the digital signal processor 30.

The offset compensation block 26 is followed by a CORDIC frequency correction block 27 for carrying out the process according to the present invention. The correction frequency f by which the baseband signal is to be corrected is supplied to the CORDIC frequency correction block 27 by the digital signal processor 30. The CORDIC frequency correction block 27 corrects the baseband signal frequency, as previously described, by the correction frequency f.

The CORDIC frequency correction block 27 is followed by a digital postfilter 28, which is cycled at precisely twice the sampling rate 2 of the baseband signal. The digital postfilter 28 is a low pass filter with a large edge steepness and serves to remove interfering frequencies and noise of the baseband signal.

The frequency-corrected and many times filtered baseband signal is then decimated by a second decimator 29 by a factor 2 to the sampling rate of the baseband signal, and is supplied to the digital signal processor 30 for further processing.

The process according to the present invention and the corresponding device for carrying out the process may also be used for frequency correction in a transmitter and a receiver of a UMTS (Universal Mobile Telecommunication System) mobile radio device. A further application is a use of the process according to the present invention everywhere in transmitters and receivers where the process according to the invention and the corresponding device serves, in addition to frequency correction, also for digital frequency mixing. Because the functions of frequency correction and frequency mixing are very often used, traditional mixers can be saved in this manner and thus the cost can again be markedly reduced. Examples of such a transmitter and receiver are found in cordless telephones of the DECT standard (Digital Enhanced Cordless Telephone), DVB (Digital Video Broadcasting), and cable modems.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of a digital frequency correction in a device, comprising:

sampling a signal with a sampling cycle (k) and digitizing the sampled signal to produce a digitized signal (x(k));

processing an N-step Coordinate Rotation Digital Computer (CORDIC) algorithm so that a frequency of the digitized signal (x(k)) is altered at a predetermined frequency;

representing the digitized signal (x(k)) by a first vector comprising a first in-phase component ($i_0$) and a first quadrature component ($q_0$) in a complex I/Q plane;

imaging the first vector onto a second vector with a second in-phase component ($I_N$) and a second quadrature component ($Q_N$) by applying the N-step CORDIC algorithm to perform a vector rotation with a predetermined angle (z(k)), wherein the second vector represents a signal with an altered frequency and phase; and composing said predetermined angle (z(k)) of N different rotation angles ($\alpha_n$), wherein each of the different rotation angles ($\alpha_n$) are calculated according to arctan ($2^{-n}$), n=0, 1, ..., N−1, and are respectively provided with a sign ($\sigma_n$) providing a direction of rotation.

2. The method as recited in claim 1, wherein the predetermined angle (z(k)) is limited to a range of 0 to $2\pi$, and where the predetermined angle (z(k)) is represented by a register value (w(k)), a bit width $N_w$ prescribing the range of 0 to $2\pi$ for the predetermined angle (z(k)), the register value (w(k)) being calculated in each cycle (k) of the sampling cycle by an addition of a value (f·T/m), allocated to the predetermined angle (z(k)), and a register value w(k−1)) of the preceding cycle (k−1) of the sampling cycle, where an overflow of the register value (w(k)) is neglected.

3. The method as recited in claim 2, wherein the predetermined angle (z(k)) is limited to a range of $-\pi/2$ to $+\pi/2$, where a quadrant correction is carried out before the CORDIC algorithm, and the first in-phase component ($i_0$) and the first quadrature component ($q_0$) are respectively multiplied by $(-1)^s$, s=0, 1.

4. The method as recited in claim 3, wherein the bit width $N_w$ of the register value (w(k)) comprises:

$$N_w \geq \log 2(m) - \log 2(\Delta f \cdot T),$$

where m comprises an oversampling factor of the signal (x(k)) and T represents a duration of a digital value of the signal (x(k)).

5. The method as recited in claim 4, wherein a number N of operations of the CORDIC algorithm for a predetermined signal to phase noise ratio (SNR) and the bit width $N_w$ of the register value (w(k)) comprises a following condition:

$$(SNR+3)/6 \leq N \leq N_w - 2.$$

6. The method as recited in claim 5, wherein two guard bits are provided in each operation of the CORDIC algorithm, and an input and output bit width of the CORDIC algorithm is at least greater than N+2.

7. An apparatus of a digital frequency correction of a signal, which is sampled with a sample cycle (k) and is digitized (x(k)), comprising:

N micro-rotation blocks receiving a signal ($i_0$, $q_0$) where $N \geq 2$ a sign table providing to each micro-rotation block a sign ($\sigma_n$) from a sign table;

a register driving the sign table and supplying a register value (w(k));

a delay element; and an adder adding a predetermined frequency value to an output value of the delay element, outputting a result indicative thereof, and storing the result in the register, wherein the register value of a preceding cycle (k−1) is supplied to the delay element.

8. The apparatus as recited in claim 7, further comprising:

a quadrant correction block preceding the micro-rotation blocks, to which an input signal (s) is supplied, rotating the signal into a first or fourth quadrant of the complex I/Q plane and providing a vector ($i_0$, $q_0$) representing the signal being rotated.

9. The apparatus as recited in claim 8, wherein each micro-rotation block comprises:

two shift registers shifting components of an input vector ($I_n$, $Q_n$) of the micro-rotation block by n bits and providing output values, and two accumulators adding the components of the input vector ($I_n$, $Q_n$) to the output values of the shift registers, the output values of the shift registers being provided with the sign ($\sigma_n$) allocated to the respective micro-rotation block.

10. The apparatus as recited in claim 9, wherein the sign table comprises a read-only memory comprising $2^N$ (N−2) bits, an XOR gate, and an inverter to produce a sign ($\sigma_0$, $\sigma_1$) for the first and second micro-rotation blocks and the input signal (s) for the quadrant correction block.

11. The apparatus as recited in claim 10, wherein the input signal (s) for the quadrant correction block is formed by a logical XOR operation on two lowest-value bits ($w_0$, $w_1$) of the register value (w(k)).

12. The apparatus as recited in claim 11, wherein the sign ($\sigma_0$) for the first micro-rotation block corresponds to a second bit ($w_1$) of the register value (w(k)).

13. The apparatus as recited in claim 12, wherein the sign ($\sigma_1$) for the second micro-rotation block corresponds to an inverted third bit ($w_2$) of the register value (w(k)).

14. The apparatus as recited in claim 13, the apparatus further comprising:

a receiver of a mobile radio device, comprising:

a baseband filter with stages filtering and processing a received baseband signal (x(k)); and a last stage of the baseband filter to correct the frequency of the baseband signal x(k)).

15. The apparatus as recited in claim 14, further comprising:

an offset compensation of the baseband signal (x(k)) to remove DC portions.

16. The apparatus as recited in claim 14, wherein a GSM or UMTS mobile radio device comprises the receiver.

17. The apparatus as recited in claim 15, wherein the apparatus provides a communication system for digital IF mixing and/or frequency correction.

18. The method as recited in claim 1, wherein the predetermined angle (z(k)) is limited to a range of $-\pi/2$ to $+\pi/2$, where a quadrant correction is carried out before the CORDIC algorithm, and the first in-phase component ($i_0$) and the first quadrature component ($q_0$) are respectively multiplied by $(-1)^s$, s=0, 1.

19. The method as recited in claim 2, wherein the bit width $N_w$ of the register value (w(k)) comprises:

$$N_w \geq \log 2(m) - \log 2(\Delta f \cdot T),$$

where m comprises an oversampling factor of the signal (x(k)) and T represents a duration of a digital value of the signal (x(k)).

20. The method as recited in claim 18, wherein a number N of operations of the CORDIC algorithm for a predetermined signal to phase noise ratio SNR and the bit width $N_w$ of the register value (w(k)) comprises a following condition:

$(SNR+3)/6 \leq N \leq N_w - 2$.

21. The method as recited in claim 2, wherein a number N of operations of the CORDIC algorithm for a predetermined signal to phase noise ratio SNR and the bit width $N_w$ of the register value (w(k)) comprises a following condition:

$(SNR+3)/6 \geq N \geq N_w - 2$.

22. The apparatus as recited in claim 7, wherein each micro-rotation block comprises:
  two shift registers shifting components of an input vector ($I_n$, $Q_n$) of the micro-rotation block by n bits and providing output values, and
  two accumulators adding the components of the input vector ($I_n$, $Q_n$) to the output values of the shift registers, the output values of the shift registers being provided with the sign ($\sigma_n$) allocated to the respective micro-rotation block.

23. The apparatus as recited in claim 8, wherein the sign table comprises a read-only memory comprising $2^N$ (N−2) bits, an XOR gate, and an inverter to produce a sign ($\sigma_0$, $\sigma_1$) for the first and second micro-rotation blocks and the input signal (s) for the quadrant correction block.

24. The apparatus as recited in claim 10, wherein the sign ($\sigma_0$) for the first micro-rotation block corresponds to a second bit ($w_1$) of the register value (w(k)).

25. The apparatus as recited in claim 10, wherein the sign ($\sigma_1$) for the second micro-rotation block corresponds to an inverted third bit ($w_2$) of the register value (w(k)).

26. The apparatus as recited in claim 11, wherein the sign ($\sigma_1$) for the second micro-rotation block corresponds to an inverted third bit ($w_2$) of the register value (w(k)).

27. The apparatus as recited in claim 15, wherein a Global System for Mobile Communications (GSM) or Universal Mobile Telecommunication System (UMTS) mobile radio device comprises the receiver.

28. A method of correcting frequency of a signal recorded as a plurality of digital samples x(k) corresponding to a sampling cycle (k) in a device comprising:
  representing each of the plurality of digital samples x(k) by a first vector comprising a first in-phase component ($i_0$) and a first quadrature component ($q_0$) in a complex I/Q plane;
  determining a plurality of angles z(k) by adding N different rotation angles ($\alpha_n$), wherein each of the different rotation angles ($\alpha_n$) are calculated according to arctan($2^{-n}$), n=0,1, . . . , N−1, and are respectively provided with a sign ($\sigma_n$) corresponding to a direction of rotation; and
  imaging the first vector onto a second vector with a second in-phase component ($I_n$) and
  a second quadrature component ($Q_N$) by applying an N-step Coordinate Rotation Digital Computer (CORDIC) algorithm using the plurality of angles z(k) to perform rotation of the first vector representing one of the plurality of samples x(k), so that the second vector represents
  digital samples of a corrected signal having a predetermined frequency.

* * * * *